(No Model.)
2 Sheets—Sheet 1.
T. C. DUFFIELD.
TOOL FOR FORMING HEADS OF BOTTLES.
No. 586,532.
Patented July 13, 1897.
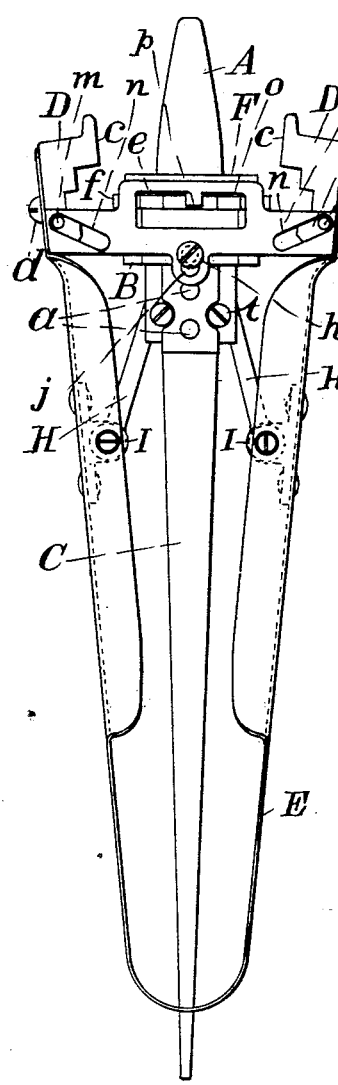
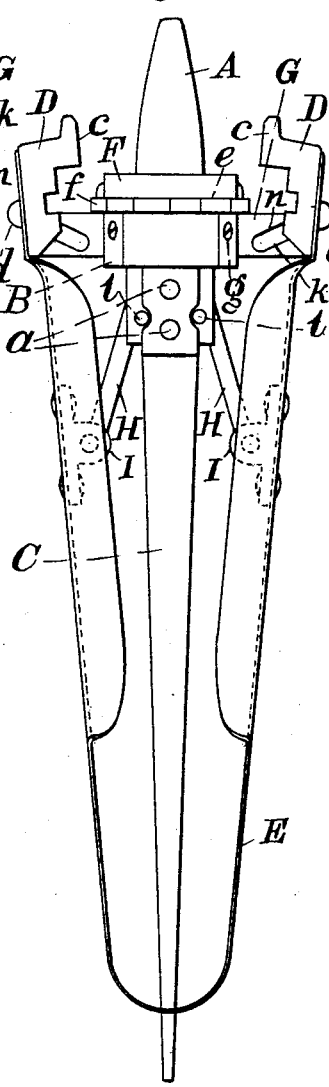
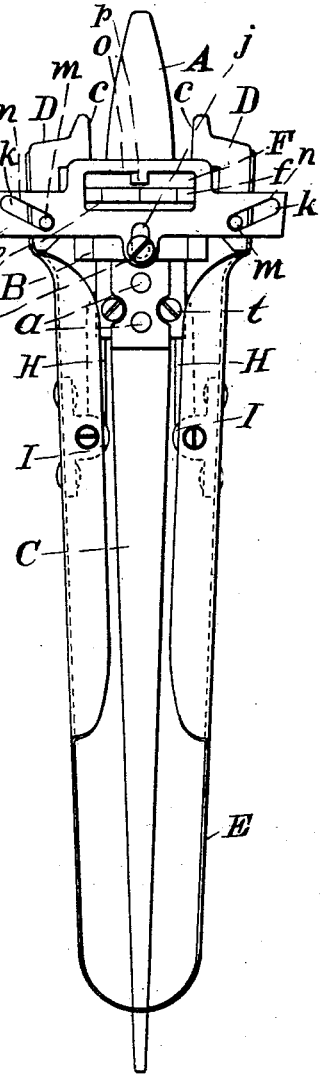
WITNESSES
Dan'l Fisher
Harry Constantine
INVENTOR
Thomas C. Duffield,
by Geo. W. T. Heard,
atty.

(No Model.) 2 Sheets—Sheet 2.

T. C. DUFFIELD.
TOOL FOR FORMING HEADS OF BOTTLES.

No. 586,532. Patented July 13, 1897.

WITNESSES
Dan'l Fisher
Harry Constantine

INVENTOR
Thomas C. Duffield
by Geo. W. T. [illegible]
Atty.

UNITED STATES PATENT OFFICE.

THOMAS C. DUFFIELD, OF BALTIMORE, MARYLAND, ASSIGNOR OF ONE-HALF TO JACOB PEASE, OF BROOKLYN, NEW YORK.

TOOL FOR FORMING HEADS OF BOTTLES.

SPECIFICATION forming part of Letters Patent No. 586,532, dated July 13, 1897.

Application filed August 29, 1896. Serial No. 604,256. (No model.)

*To all whom it may concern:*

Be it known that I, THOMAS C. DUFFIELD, of the city of Baltimore and State of Maryland, have invented certain Improvements in Tools for Forming the Heads of Bottles, of which the following is a specification.

This invention relates to certain improvements in that class of tools for the above-named purpose whereby the heads of bottles and jars are provided with exterior screw-threads and thereby adapted to receive threaded closing-caps.

In the further description of the said invention which follows reference is made to the accompanying drawings, forming a part hereof, and in which—

Figure 4:
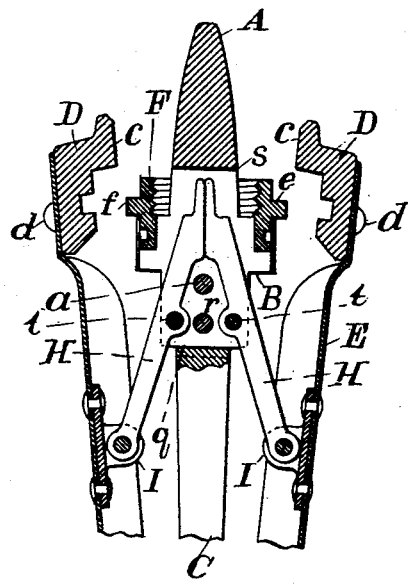
Figure 5:
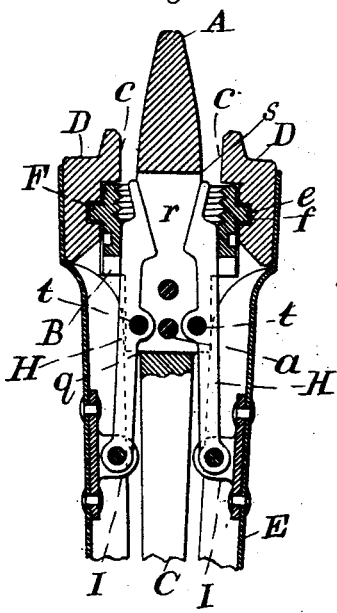
Figure 7:
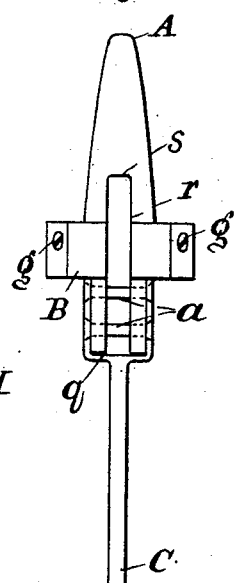
Figure 6:
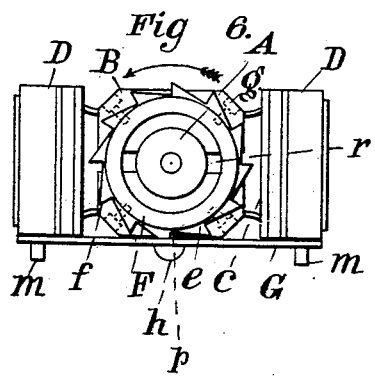

Figure 1 is an exterior side view of the improved tool when open. Fig. 2 is a rear view of Fig. 1. Fig. 3 is a view similar to Fig. 1, except that the tool is shown closed. Fig. 4 is a vertical section of Fig. 1. Fig. 5 is a vertical section of Fig. 3. Fig. 6 is a top end view of Fig. 1. Fig. 7 is an edge view of a part of the tool.

Referring now to the drawings, A is a mandrel or spindle adapted for insertion in the mouth of a bottle when the same is in a plastic state or condition to give to it the proper or required diameter. At the base of the mandrel A is a block B, and to this block is attached by means of pins or rivets $a$ the tailpiece C.

The shape of the block B as seen from the point of the tool (see Fig. 6) is preferably square with the corners taken off.

D D are jaws, the parts $c$ of which form the outside of the bottle-head below the threaded portion thereof. They are connected by the well-known and commonly-used spring-handle E, the ends of which are held to the outer surface of the jaws by screws $d$. The tailpiece passes loosely through the extremity of the spring-handle.

F is a cylinder having a collar $e$, provided with teeth $f$. The portion of the cylinder F below the toothed collar is seated and adapted to turn loosely in an annular groove formed in the block B, and the part of the cylinder which projects beyond the block B is interiorly threaded and forms the matrix for the threaded head of the bottle. Screws $g$ in the block B enter an annular groove in the cylinder and prevent dislocation of the said parts, while they admit of the free revolution of the cylinder.

G is a plate attached to the block B by means of a screw $h$, which passes through an elongated hole $j$ therein. The plate therefore has a limited movement longitudinally of the tool. The plate is shown in its lowest position in Fig. 1 and in its highest position in Fig. 3.

The plate G has angular slots $k$, and through these slots are inserted pins $m$, screwed tightly into the edges of the jaws D. The outer ends of the slots $k$ limit the outward motion of the jaws, and when the jaws are closed, so as to bring their inner surfaces in contact with the block, the pins bearing against the inclined surfaces $n$, bounding the slots, causes the plate to move outward, as shown in Fig. 3. The plate G has a horizontal slot $o$, the upper edge of which rests on the teeth $f$ of the collar $e$ when it is down, and its width is such as to allow of the outward movement of the plate without the lower edge of the slot coming into contact with the under side of the teeth. (See Fig. 3.)

Within the slot $o$ and projecting downward from its upper edge is a tooth $p$, adapted, when the plate G is in its lowest position, to engage with the teeth $f$ of the collar $e$ and thereby prevent the turning of the cylinder. When the plate is raised, the tooth is clear of the teeth $f$ and the collar may be revolved.

The block and mandrel are provided with a slot $r$, which begins at $q$ and extends upwardly to $s$, which is a little above the upper edge of the cylinder.

H H are levers pivoted within the slot $r$ by pins or screws $t$, with their lower ends hinged to lugs I, fastened to the inner surface of the spring-handle E.

The upper ends of the lever H, when the jaws are distended, come together, (see Fig. 4,) and in such position they are adapted to easily enter the mouth of the bottle. When the jaws are closed, the ends of the levers H are moved outward (see Fig. 5) and serve to press the glass wall tightly in contact with the internally-threaded surface of the cylinder F.

The operation of the tool is as follows: The head of the bottle while in a heated and plastic condition is pushed over the mandrel and into the internally-threaded cylinder and the jaws closed thereon. As the jaws close the ends of the levers H force the glass tightly within the cylinder, and the head is thereby threaded, and the bottle is turned to form the neck or portion of the head below the thread, the cylinder turning with the bottle, as the tooth $p$ of the plate G is clear of the teeth $f$ of the collar $e$, which would otherwise lock it. When the head is finished, the jaws are allowed to distend, and in their distention the cylinder is locked by the engagement of the tooth $p$ with its teeth $f$. The bottle is now turned in the direction of the arrow in Fig. 6, when the head is unscrewed out of the cylinder.

I claim as my invention—

In a tool for forming a thread on the exterior surface of a bottle-head, the combination of a pair of jaws which are normally distended by means of a spring-handle, a stationary central spindle or mandrel, an internally-threaded cylinder adapted to turn about the central mandrel having a toothed collar on its surface, a plate having inclined slots at its ends, pins which pass through the inclined slots and are secured in the jaws, a tooth on the said plate adapted to engage with the teeth of the revoluble cylinder when the jaws are distended, and to move from engagement with the said teeth when the said jaws are contracted on the bottle-head, and levers loosely connected at their lower ends to the spring-handle and pivoted within a slot in the central spindle and its block with their upper ends arranged to disappear within the said spindle when the jaws are distended and project beyond the surface of the said spindle when the jaws are contracted on the bottle-head and thereby set out the soft glass tightly against the threaded inner surface of the cylinder while the same is free to revolve with the bottle, substantially as specified.

THOMAS C. DUFFIELD.

Witnesses:
DANL. FISHER,
WM. T. HOWARD.